Feb. 4, 1964     D. P. SMITH     3,120,025
POULTRY DEFEATHERING FINGERS
Filed Nov. 13, 1962     3 Sheets-Sheet 1
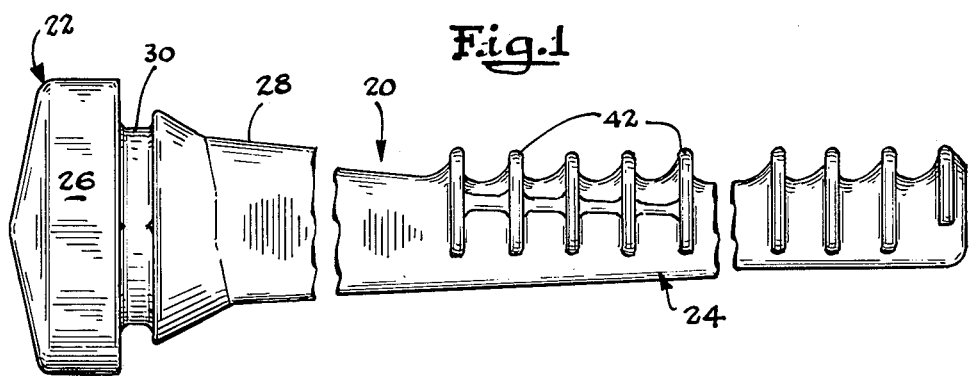
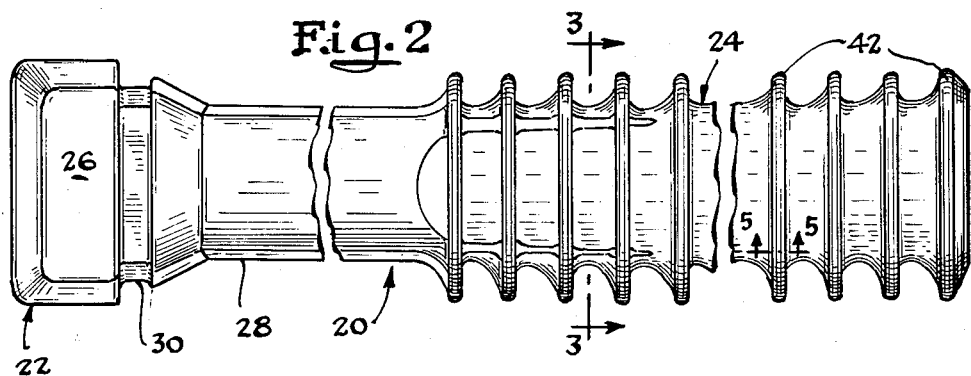
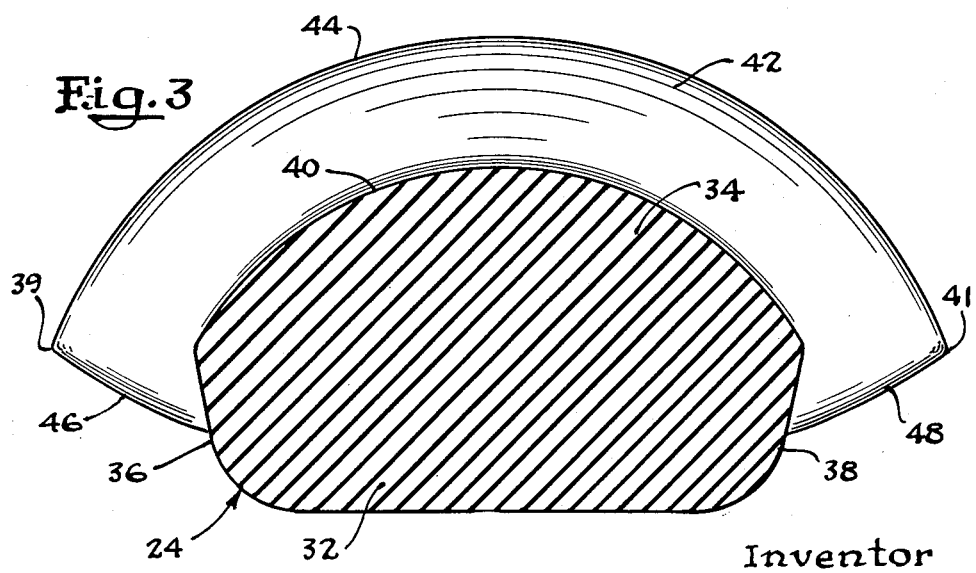
Inventor
Donald P. Smith
By George E. Frost - Keith J. Kulie
Attorneys

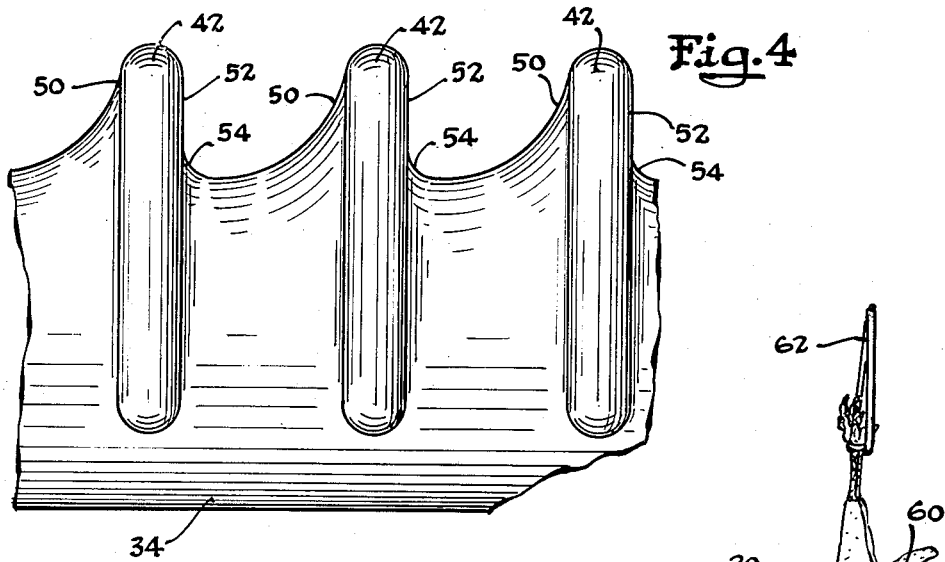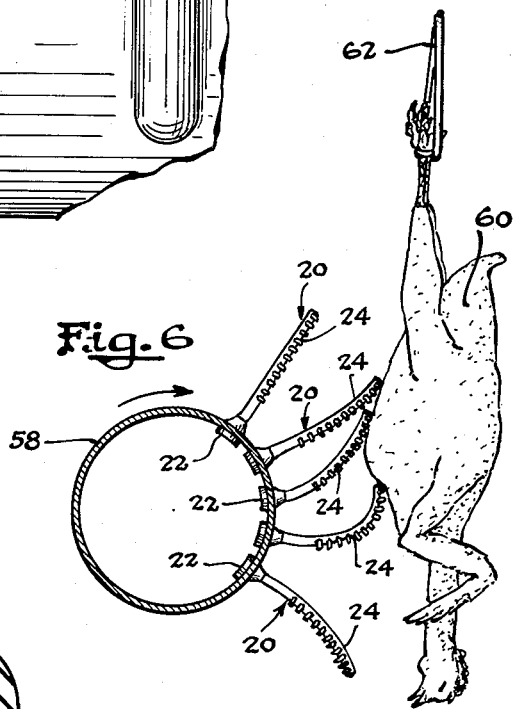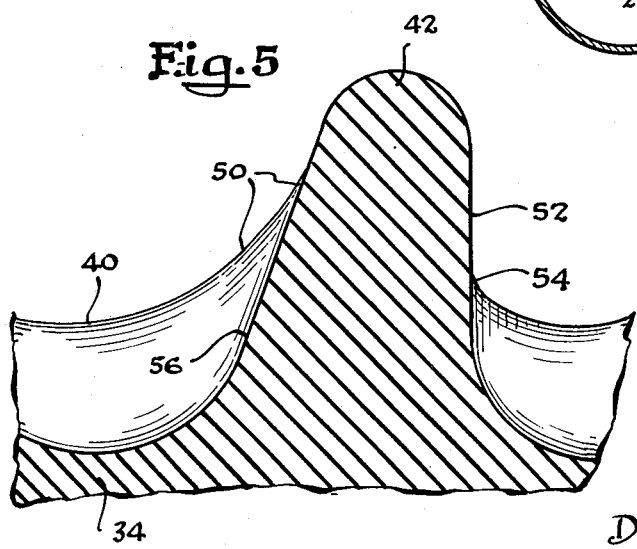

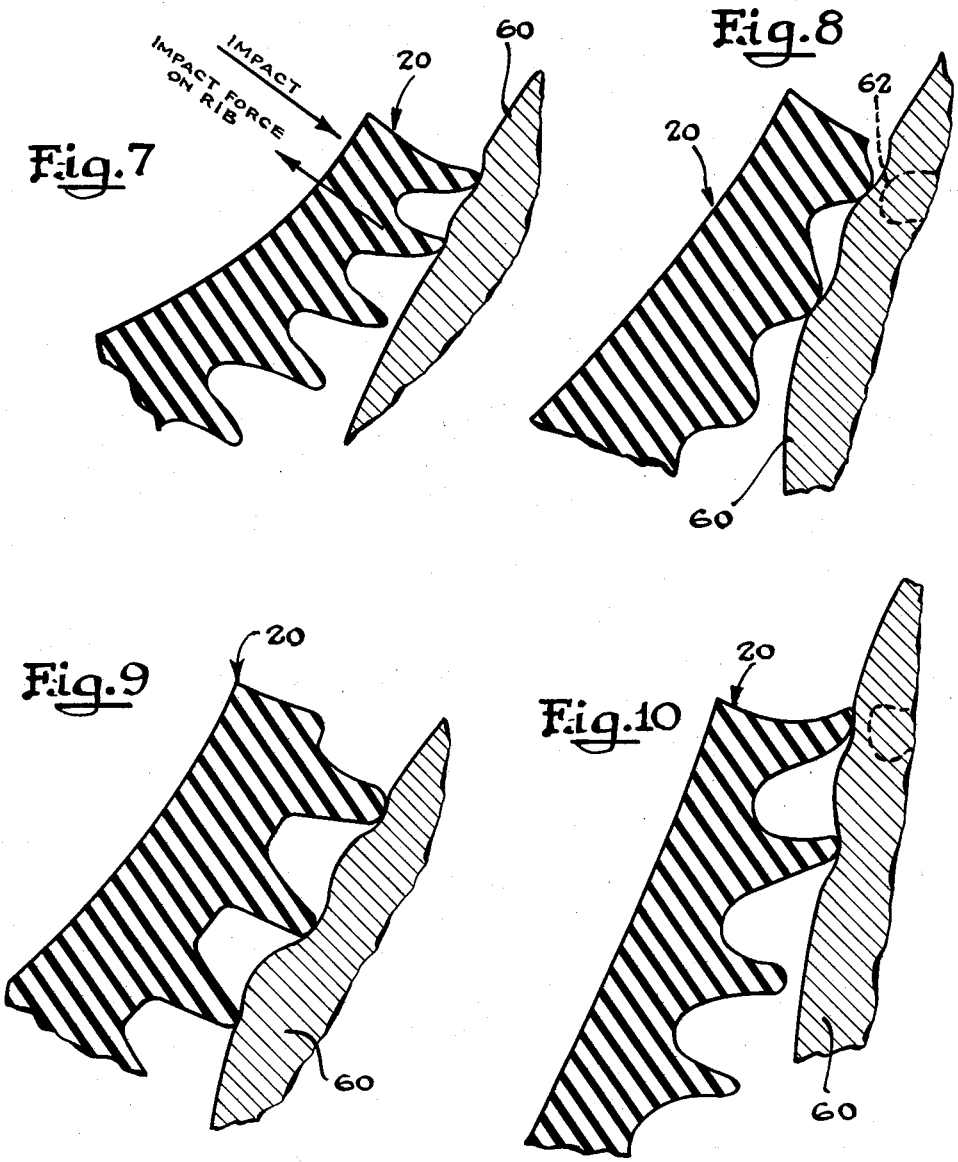

United States Patent Office 3,120,025
Patented Feb. 4, 1964

3,120,025
POULTRY DEFEATHERING FINGERS
Donald Paul Smith, Dallas, Tex., assignor to John Mohr
& Sons, Chicago, Ill., a corporation of Illinois
Filed Nov. 13, 1962, Ser. No. 237,135
7 Claims. (Cl. 17—11.1)

The present invention relates to resilient fingers and, more particularly, it relates to an improved finger construction for defeathering poultry.

The present method of removing feathers from poultry involves hanging of the poultry on suitable suspension means and then passing them into or between rotating drums having flexible fingers extending therefrom. The flexible fingers engage the feathers of the bird and frictionally rub them away from epidermal engagement with the bird. Standard processing normally requires that the poultry first be immersed or passed through a hot water bath in order to loosen the engagement of the feather with the poultry and to facilitate removal of the feathers without the necessity of heavy contact of the fingers with the skin of the bird.

It should be observed that the removal of the feathers from the bird must be done without breaking the skin of the bird or without bruising or barking of the skin. If any damage to the skin occurs the process must, of course, be modified. A marred bird is not appealing to the consumer generally. The process, therefore, is one of considerable concern and one that in recent years has demanded attention. The requirement for and development of high speed processing lines in recent years has further complicated the feather removal process.

The design of flexible fingers for the rotatable picking drums becomes more important as the processing speeds increase. The dynamic action of the fingers striking against the poultry as well as the rubbing action necessary for the removal of feathers from the bird becomes significant features contributing to overall design of an acceptable finger that will not bruise, bark or break the skin of the bird. It is necessary to develop a finger that will possess sufficient flexibility to deflect upon impact with the bird and yet one that is rigid enough to remove the feathers upon frictional engagement therewith.

An additional aspect that enters into the design requirements of defeathering fingers for processing lines resides in the fact that the growth cycle of broiler or frier chickens have in recent years been accelerated. For example, such chickens used to be processed when they reached the ages of 12 to 14 weeks, however, they now are being processed at the ages of 7 to 9 weeks. The poultry are grown more quickly and a result the epidermal layers of the birds are more tender than was present on the birds that were processed at a later age. This epidermal tenderness, coupled with the high speed picking lines in present day processing, emphasizes the need for attention to detail in the design of equipment for handling the poultry.

The present invention is directed to the provision of a flexible finger for defeathering poultry that is devoid of sharp or protruding ridges in the bird engaging area of the finger and one wherein the individual ribs of the finger are designed such that they will flex readily away from the bird upon impact therewith and yet are sufficiently reinforced to withstand repeated flexing without deterioration or breakage.

It, accordingly, is a general object of the present invention to provide an improved flexible finger for defeathering poultry.

A further object of the present invention resides in the provision of an improved resilient finger for defeathering poultry wherein the poultry engaging portions of the finger are smoothly flared.

Another object of the present invention resides in the provision of an improved flexible finger for defeathering poultry wherein the individual ribs extending at spaced intervals along the finger define a segment of a disc or cylinder and have a generally arc shaped periphery.

An additional object of the present invention resides in the provision of an improved flexible finger for defeathering poultry wherein the ribs extending along the finger have relatively high deflection characteristics in direction away from the movement of the finger across the poultry.

A still further object of the present invention resides in the provision of an improved flexible finger for defeathering poultry wherein the ribs extending along the finger have high deflection characteristics in one direction and are reinforced along the opposite wall to prevent deterioration or failure of the picking ribs of the finger.

Another object of the present invention resides in the provision of an improved finger for defeathering poultry wherein the poultry contacting portions of the finger are smoothly flaring and generally arc shaped and where no sharp or rigid portions are presented to the bird when the finger is in engagement therewith.

Still another object of the present invention resides in the provision of an improved flexible finger for defeathering poultry wherein the individual transverse ribs extending along the main finger body have deflection characteristics defining a continuously varying flexure characteristic along the vertical dimension of the ribs whereby the outer section of each rib is highly flexible and the inner section of each rib is relatively less flexible and whereby flexure occurs more readily in one rib direction along the main finger body than in the other rib direction.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 is a fragmentary side elevation of the finger of the present invention;

FIGURE 2 is a top view of the finger illustrated in FIGURE 1;

FIGURE 3 is an enlarged view of a section of the finger taken along lines 3—3 of FIGURE 2 illustrating in greater detail the configuration of the main body and the ribs of the flexible finger of the present invention;

FIGURE 4 is an enlarged fragmentary view of the picking rib section of the finger of the present invention illustrating the flaring front wall section of the ribs in greater detail;

FIGURE 5 is an enlarged, fragmentary view partly in section taken along line 5—5 of FIGURE 2;

FIGURE 6 is a schematic representation of the defeathering operation illustrating the flexible fingers mounted on a rotatable drum;

FIGURE 7 is a schematic representation of the forces acting upon a flexible finger during the defeathering process;

FIGURE 8 is a schematic representation of the defeathering process with a conventionally prepared uniformly sectioned flexible finger, with heavy rounded ribs;

FIGURE 9 is a schematic representation of the defeathering process with a flexible finger having picking ribs with vertical front and back walls; and FIGURE 10 is a schematic representation of the defeathering process with the flexible finger of the present invention.

Referring more particularly now to FIGURE 1 of the drawings the flexible finger of the present invention is illustrated generally at 20. The finger includes a head portion 22 and a main body 24, said main body extending outwardly from the head portion of the finger and integrally formed therewith.

The head 22 of the finger 20 is defined by a heavy section 26 at the head terminal of the finger 20 said heavy section extending into a shank section 28. Intermediate the heavy section 26 and the shank 28 of the finger 20 is a recess 30 extending about the periphery of the head 22. The recess is provided in the head section so that the finger may conveniently be inserted into a rotatable picking drum (as described hereinbelow) with the recess fitting snugly into an opening in the drum provided therefor. The heavy section 26 then supports the finger within the drum so that the finger extends in a generally radial direction with respect to the drum.

The shank 28 of the finger 20 tapers gradually downwardly to merge smoothly into the main body 24 of the finger to thereby define a continuously decreasing section of flexible material extending from the heavy section 26 of the head 22 to the main body 24. The shank section 28 is provided to prevent breakage of the finger at a point adjacent fixture of the finger to the rotatable drum where, without such support, the finger would be most likely to occur maximum flexure and be required to withstand the maximum dynamic forces. The main body 24 of the finger 20 is substantially uniform in cross-section from the terminal merger point of the shank 28 into the main body to the free end of the finger.

The main body 24 of the finger 20 is defined by a generally rectangular bottom portion 32 and an integrally formed upper portion 34, as indicated in the view of FIGURE 3. The side walls 36 and 38 of the rectangular portion 32 of the body 24 are illustrated as flaring slightly outwardly and away from the general axis of the body 24. The exact configuration of the rectangular portion is not critical and the side walls may be formed generally vertically without departing from the spirit of the improved finger disclosed herein.

The upper periphery of the upper portion 34 of the body 24 is defined by an arc 40. The arc 40 of the section 34 is struck, for example, on the radius defined between the periphery of the arc 40 and point 42. The terminal portions of the arc extend downwardly in smoothly arced fashion to intercept the side walls 36 and 38, respectively, of the rectangular portion 32 of the body 24. The arced upper portion 34 of the body 24 engages the poultry during the defeathering process and it is important that there be no sharp or hard ridges in this section of the finger. Some of the prior art finger designs contemplate the provision of a bar-like or generally rectangular body section for the entire body of the finger. It should be observed that with this type of body configuration, even if the corners of the bar-like body are rounded, the corners will be relatively rigid and will be more likely to bruise or bark the epidermal portion of the bird during the defeathering process.

The frontal elevation of the ribs 42 of the finger 20 is illustrated in FIGURE 3. As indicated, each of the ribs 42 extends generally normally outwardly from the upper portion 34 of the main body 24.

The outer periphery of each of the ribs 42 defines an arced first rib portion 44 with each of the peripheral points along the arc 44 being radially equidistant from the radially related points along the top arced surface 40 of the upper body portion 34. The ribs 42 extend over the upper body portions and toward the sides of the finger 20, terminating at 39 and 41 in spaced relation to the side walls 36 and 38, respectively, of the body 24. This configuration provides a rib construction having substantially equal dynamic characteristics along the extent of the finger to thereby give smooth uniform defeathering action. A second portion of the ribs 42 is defined by the generally inverted arced sections 46 and 48, respectively, which extend outwardly and upwardly from each of the side walls of the lower body 32 up to and joining with the spaced terminals 39 and 41 of the first rib portion. It should be observed that the entire flexible finger 20 is molded in one-piece form to provide the most effective and economical construction.

In some previous flexible finger constructions the ribs were provided with front and back rib walls of identical configuration. For example, many of the picking ribs of defeathering fingers are provided with vertical front and back walls, the vertical wall section extending from the periphery of the rib down to the point where the rib wall merges with the main body section of the finger. This section construction provides for greater rib flexibility in that the complete radially extending rib may deflect under impact with the poultry being processed. Such vertical wall construction for both the front and the back walls of the rib, however, is generally unsatisfactory in that sufficient rigidity is not provided to assure uniform picking action over the entire surface of the fowl and also in that premature failure of the ribs may occur under the dynamic forces encountered in the repeated flexure of the ribs during the picking or defeathering process. It should be noted that the forces required for safe and efficient removal of feathers from poultry will vary over the surface of the bird. Thus, in the area where the skeletal structure of the bird extends substantially to the outer surface thereof, the finger must be capable of substantial flexure in order to assure that the outer epidermal layer is not bruised during the defeathering operation. Conversely, the forces required for defeathering over the soft areas of the poultry may be such that little flexure could be tolerated in order to assure efficient defeathering. If the front and back wall structure of the ribs of the fingers are identical then it can readily be seen that the required variance in applied force to the poultry is not available. The finger of the present invention provides an improved rib construction that is arced about the surface in engagement with the poultry and that is varied in transverse rib cross-section to allow for varying flexure of the ribs during the defeathering process. The requirement for the available variance in sensible flexure characteristics with respect to the outer epidermal layer of the poultry becomes more important as the processing speeds increase and the time available for defeathering of the poultry becomes less.

As indicated in FIGURES 4 and 5 of the drawings, the ribs 42 of the finger 20 each generally define a front wall 50 and a back wall 52. The back wall 52 of each of the ribs 42 extends substantially from the outer periphery of each rib vertically downward to intersect with the arced periphery 40 of the upper portion 34. The joint area 54 between the back wall 52 and the upper portion 34 is flared slightly to define a fillet to provide a smooth contour and eliminate a possible stress area on the finger. It is thus seen that the back wall 52 construction is such that no resistance to flexure is added beyond that inherent in the material of which the finger is molded.

The front wall 50 of each of the ribs 42 extends in generally flaring fashion from substantially the outer periphery of the ribs 42 to a line of intersection with the periphery 40 of the upper portion 34 in the area adjacent the back wall 52 of the next succeeding rib. It is thus seen that a relatively large amount of material is provided on the front wall of the ribs 42 whereby deflection is resisted by that wall.

In addition to provision of a relatively large portion of material in the central area of the front wall 50 of the ribs 42, a proportionately large amount of material 56 has been included along the portions of the front wall 50 of the ribs adjacent the outboard portions of the upper portion 34 of the main body 24. Initially the front wall portion of the ribs 42 was substantially vertical along this area in order to provide for adequate deflection of the rib along the side walls thereof to prevent bruising or barking of the outer epidermal layer of the poultry in the defeathering process. It was discovered, however, that there was little variance in deflective characteristics of the rib with such construction and that the rib with such construction was subject to rapid deterioration under repeated flexure. It was surprisingly discovered that with the addition of additional material in this area the desired variable flexure characteristics were obtained and that injury to the yellow cuticle or outer layer of skin of the bird was not precipitated by such addition. The ribs of the fingers with such material added were not made sufficiently rigid to prevent deflection thereof during the defeathering process.

A schematic representation of the defeathering process is shown in FIGURE 6, wherein a rotatable drum 58 is provided with means therein to receive the recess 30 of the heads 22 of the fingers to thereby provide for mounting of the fingers 20 within the drum 58. As indicated, the fingers 20 when mounted in the drum 58 extend radially outwardly from the drum 58, being supported thereby only by the head of the finger with the outer terminal portion of the finger being free.

The poultry 60 are suspended from shackles 62 in a manner well known to the art, the shackles 62 being suspended upon a continuously moving conveyor line. The poultry are processed through a hot water bath to loosen the feathers on the bird and then are passed into the defeathering area of the processing line. In the latter area the poultry are moved into frictional engagement with the flexible fingers 20 of the defeathering apparatus. The fingers 20 rub along the wetted feathers of the bird and frictionally move the feathers along and out of engagement with the epidermal layers of the poultry. It should be observed that the defeathering apparatus may include a pair of drums (or more) extending along opposite sides of the path through which the poultry is moved by the conveyor line and thereby removal of the feathers from the bird is expedited by engagement of the fingers along all portions of the poultry.

FIGURE 7 is illustrative of the forces acting upon the fingers 20 and upon the poultry during the defeathering process. One of the forces encountered is that imparted to the poultry and to the finger upon impact of the finger with the poultry. If the ribs of the finger offer considerable resistance to flexure or deflection it is readily seen that the ribs may damage the outer yellow cuticle layer of the poultry. Engagement of the finger with the poultry, of course, tends to flex the entire finger which is freely supported from the drum by the head of the finger. Flexing of the finger gives rise to relatively high localized stresses at the base of the ribs where they integrally merge with the main body of the finger. This stress is magnified in the rib-joint area due to flexure of the individual ribs with respect to the main body of the finger during engagement of the fingers with the poultry.

The finger illustrated in FIGURE 8 of the drawings is typical of those having a rib construction adequate to withstand the bending forces imparted to the rib structure of the fingers during the defeathering operation. The flaring ribs are relatively sturdy along the entire extent of the rib portion extending away from the main body of the finger. Very little deflection of the ribs occurs with such construction, the rib yielding primarily due to compression of the material of which the finger is molded. It can readily be seen that the rib exerts substantially the same force against the outer epidermal surface of the poultry over the entire area thereof. One of the problems encountered with such fingers, for example, resides in defeathering over area of the poultry where the skeletal structure extends very close to the outer surface area as schematically indicated at 62. In such areas the heavy finger construction of FIGURE 8 is likely to cause bruising or barking of the outer epidermal layer in view of the fact that it is relatively insensitive to resistance of the skin of the poultry to depression. The result is that the area overlying the skeletal structure may be bruised and precipitates an unappealing appearance to the bird for display on the retailer's freezer shelf.

The triangular rib finger construction, another of which is in common use, is schematically illustrated in FIGURE 9 of the drawings. In this construction the front and back walls of the rib are provided with a tapering materials section extending from the peripheral outer surface of the ribs down toward the main body section of the finger, the transverse rib section generally widening from the outer extremity of the rib toward the main body of the finger. As in the rounded rib finger construction of FIGURE 8, the flexure of the rib is realized primarily in compression of the material from which the finger is molded. The materials section adjacent the rib-main body joint area is too large and rigid to permit ready flexure of the rib for deflection over, for example, the areas of the bird adjacent the skeletal structure. For this reason the triangular rib finger construction may also cause an injury to the outer yellow cuticle layer of the poultry and give rise to an unpleasant appearance of the finished product.

The generally straight walled construction for the front and back walls of the ribs is generally not employed in defeathering equipment due to the fact that considerable rib and finger breakage results with such construction rendering the use of such fingers uneconomical due to frequency and cost of replacement.

The surprising result achieved with the construction of the present invention is that the straight back walled section of the rib permits ready flexure of the rib when it encounters resistance to penetration and general depression of the flesh of the poultry being processed while at the same time the flaring front wall construction lends sufficient rigidity to the rib to permit efficient defeathering of the poultry in areas permitting optimum rib pressure against the bird.

The rib construction of the present invention yields during processing both by compression as well as by deflection or flexure of the rib. It should be observed that such action results in a more uniform engagement pressure of the rib with the areas of the bird. For example, the rib will depress the soft areas of the bird to permit optimum pressure to be exerted for removal of the feathers while at the same time the rib will deflect in the "hard" areas of the bird allowing sufficient frictional engagement for removal of feathers while yielding sufficiently so that the outer cuticle layer of the skin is not injured in any manner.

The flaring front wall construction has been found to provide sufficient rigidity and strength to avoid concentration of high stress patterns under flexure of both the main finger body and of the ribs. This construction allows for ready deflection of the ribs without giving rise to undue breakage of the ribs during the processing operation.

While I have shown and described a specific embodiment of the present invention it will, of course, be understood that other modifications and alternative constructions may be used without departing from the true spirit and scope of the invention. I therefore intend by the appended claims to cover all such modifications and alternative constructions as fall within their true spirit and scope.

What I claim as new and desire to secure by Letters Patent of the United States is:

1. A resilient finger for removing feathers from poultry adapted to be mounted on a rotatable drum, said finger comprising:
   a head section defining means thereon to restrictively mount the finger with respect to the drum;
   a flexible main body extending from said head section, said main body defining a generally rectangular section along the bottom thereof and an upper body portion integral with the generally rectangular section, the upper periphery of the upper portion defining an arc intercepting the generally rectangular section; a tapering shank integral with and extending between the head section and flexible main body of the finger;

and a plurality of ribs extending outwardly from the upper portion of the flexible main body, the outer periphery of a first portion of each of the ribs defining an arc having a common axis with the arc of the upper body portion, each portion of the periphery of the first portion of the ribs being substantially radially equidistant from each radially related point on the periphery of the upper body portion, each of said first portions of said ribs terminating at either side of the main body in spaced relation thereto, each of said ribs further defining a second portion extending at each side of the main body in arched relation from the rectangular base portion of the main body to and joining the side terminal portions of the first portions, each of said ribs further defining a front and a back wall, the back wall of each rib extending in substantially vertical fashion with respect to the general longitudinal axis of the main body from substantially the outer periphery of each of the ribs to the main body portion, the front wall of each of said ribs having an integral section of resilient material extending in generally flaring fashion from substantially the outer periphery of the front wall of the rib substantially to the back vertical wall of the next adjoining rib whereby each of said ribs are readily flexed towards the back wall thereof but whereby flexure is resisted by and toward the flaring reinforced section on the front wall of each of the ribs to thereby prevent destruction of the ribs through extension of the rib material beyond the endurance limit of the material while still maintaining requisite rigidity of the fingers for optimum defeathering action.

2. A resilient finger adapted to be mounted on a rotatable drum and for removing feathers from poultry, said finger comprising:

a head section defining a recess therein extending about the periphery thereof, said recess adapted to be received within the drum to restrictively mount the finger with respect to the drum;

a flexible main body extending outwardly from said head section, said main body defining a generally rectangular section along the bottom thereof and an upper portion integral with the generally rectangular section, the upper periphery of the upper portion defining an arc intercepting the generally rectangular section;

and a plurality of ribs extending outwardly from the upper portion of the flexible main body in mutually parallel, evenly spaced intervals therealong, the outer periphery of a first portion of each of the ribs defining an arc having a common axis with the arc of the upper body portion, each portion of the periphery of the first portion of the ribs being radially equidistant from each radially related point on the periphery of the upper body portion, each of said first portion of said ribs terminating at either side of the main body in spaced relation thereto, each of said ribs further defining a second portion extending at each side of the main body in arched relation from the rectangular base portion of the main body to and joining the side terminal portions of the first portions, each of said ribs further defining a front and a back wall, the back wall of each rib extending in substantially vertical fashion with respect to the general longitudinal axis of the main body from substantially the outer periphery of each of the ribs to the main body portion, the front wall of each of said ribs having an integral section of resilient material extending in generally flaring fashion from substantially the outer periphery of the front wall of the rib substantially to the back vertical wall of the next adjoining rib whereby each of said ribs are readily flexed towards the back wall thereof but whereby flexure is resisted by the flaring reinforced section on the front wall of each of the ribs to thereby prevent destruction of the ribs through extension of the rib material beyond the endurance limit of the material while still maintaining requisite rigidity of the fingers for optimum defeathering action.

3. A resilient finger for removing feathers from poultry adapted to be mounted on a rotatable drum, said finger comprising:

a head section defining means to mount the finger to the drum;

a flexible main body integral with said head section and defining a generally rectangular section along the bottom thereof and an upper portion integral with the generally rectangular section, the upper periphery of the upper portion defining an arc intercepting the generally rectangular section;

and a plurality of ribs extending from the upper portion of the flexible main body, the outer periphery of a first portion of each of the ribs defining an arc having a common axis with the arc of the upper body portion, each portion of the periphery of the first portion of the ribs being radially equidistant from each radially related point on the periphery of the upper body portion, each of said first portion of said ribs terminating at either side of the main body in spaced relation thereto, each of said ribs further defining a front and a back wall, the back wall of each rib extending in substantially vertical fashion with respect to the general longitudinal axis of the main body from substantially the outer periphery of each of the ribs to the main body portion, the front wall of each of said ribs having a section of resilient material extending in generally flaring fashion from substantially the outer periphery of the front wall of the rib substantially to the back vertical wall of the next adjoining rib whereby each of said ribs is readily flexed towards the back wall thereof while still maintaining requisite rigidity of the fingers for optimum defeathering action.

4. A resilient finger for removing feathers from poultry, said finger adapted to be mounted on a rotatable drum, said finger comprising:

a head section having means to mount the finger to the rotatable drum;

a flexible main body integral with and extending from said head section, said main body defining an upper portion the upper periphery of which defines an arc;

and a plurality of ribs extending from the upper portion of the flexible main body, the outer periphery of each of the ribs defining an arc with each portion of the arc of each of said ribs being radially equidistant from each radially related point on the arced periphery of the upper body portion, each of said ribs terminating at either side of the flexible main body in spaced relation thereto, each of said ribs further defining a front and a back wall, the back wall of each rib extending in substantially vertical fashion with respect to the general longitudinal axis of the main body from substantially the outer periphery of each of the ribs to the main body portion, the front wall of each of said ribs having a section of resilient material extending in generally flaring fashion from substantially the outer periphery of the front wall of the rib substantially to the back vertical wall of the next adjoining rib whereby each of said ribs is readily flexed towards the back wall thereof while still maintaining requisite rigidity of the fingers for optimum defeathering action.

5. A resilient finger for removing feathers from poultry and adapted to be mounted on a rotatable drum, said finger comprising:
- a head section having means to mount the finger to the rotatable drum;
- a flexible main body extending from said head section, said main body having a portion thereof defining a generally arced configuration;
- and a plurality of ribs extending radially from the arced portion of the body, the radially outboard portion of each of said ribs defining a generally arced configuration, the outer periphery of each said outboard portion being substantially equidistant from radially related portions on the arced configuration of the body, each of said ribs defining a front and a back wall, the back wall of each rib extending in substantially vertical fashion with respect to the general longitudinal axis of the main body from substantially the outboard portion of each of the ribs to the main body portion, the front wall of each of said ribs having a section of resilient material extending in generally flaring fashion from substantially the outboard portion of the front wall of the rib substantially to the back vertical wall of the next adjoining rib whereby each of said ribs is readily flexible toward the back wall while relatively rigid in defeathering flexure for optimum defeathering action.

6. A resilient finger for removing feathers from poultry and adapted to be mounted on a rotatable drum, said finger comprising:
- a head section having means to mount the finger to the rotatable drum;
- a flexible main body extending from said head section, said main body including an upper portion having an upper periphery which defines an arc and a lower portion which is generally rectangular in cross section;
- and a plurality of ribs extending radially from the upper portion of the flexible main body, the outer periphery of each of said ribs defining an arc, each portion of said rib arc being radially equidistant from radially related portions on the arced periphery of the upper body portion, each of said ribs terminating at either side of the main body in spaced relation thereto, and a section extending outwardly from the lower portion of the main body adjacent each rib to join the side terminal portion of the related rib.

7. A resilient finger for removing feathers from poultry and adapted to be mounted on a rotatable drum, said finger comprising:
- a head section having means to mount the finger to the rotatable drum;
- a flexible main body extending from said head section, said main body having an upper portion defining a generally arced configuration and a lower portion generally rectangular in cross section;
- and a plurality of ribs extending radially from the arced portion of the flexible main body, the radially outboard portion of each of said ribs defining a generally arced configuration, the outer periphery of each said outboard portion being substantially equidistant from radially related portions on the arced configuration of the body.

References Cited in the file of this patent

UNITED STATES PATENTS

| | | |
|---|---|---|
| 2,554,671 | Hodges | May 29, 1951 |
| 2,914,794 | Barker et al. | Dec. 1, 1959 |

FOREIGN PATENTS

| | | |
|---|---|---|
| 806,740 | Great Britain | Dec. 31, 1958 |